US007912629B2

(12) United States Patent
Sutter et al.

(10) Patent No.: US 7,912,629 B2
(45) Date of Patent: *Mar. 22, 2011

(54) METHODS, APPARATUSES, AND COMPUTER PROGRAM PRODUCTS FOR TRAFFIC DATA AGGREGATION USING VIRTUAL TRIP LINES AND A COMBINATION OF LOCATION AND TIME BASED MEASUREMENT TRIGGERS IN GPS-ENABLED MOBILE HANDSETS

(75) Inventors: David William Sutter, Mountain View, CA (US); Quinn Jacobson, Sunnyvale, CA (US); Baik Hoh, San Jose, CA (US); Murali Annavaram, Los Angeles, CA (US)

(73) Assignee: Nokia Corporation, Espoo (FI)

( * ) Notice: Subject to any disclaimer, the term of this patent is extended or adjusted under 35 U.S.C. 154(b) by 333 days.

This patent is subject to a terminal disclaimer.

(21) Appl. No.: 12/119,943

(22) Filed: May 13, 2008

(65) Prior Publication Data

US 2009/0319163 A1 Dec. 24, 2009

Related U.S. Application Data

(63) Continuation-in-part of application No. 11/948,779, filed on Nov. 30, 2007.

(51) Int. Cl.
*G06F 19/00* (2006.01)

(52) U.S. Cl. .......................... 701/118; 701/117; 701/119

(58) Field of Classification Search .................. 701/117, 701/118, 119, 200, 208–212; 340/905, 988–990, 340/995.14, 995.28, 934
See application file for complete search history.

(56) References Cited

U.S. PATENT DOCUMENTS

| | | | | |
|---|---|---|---|---|
| 6,012,012 | A | 1/2000 | Fleck et al. | |
| 2003/0187571 | A1 | 10/2003 | Impson et al. | |
| 2007/0176771 | A1 | 8/2007 | Doyle | |
| 2009/0143966 | A1 * | 6/2009 | Jacobson et al. .............. | 701/118 |

FOREIGN PATENT DOCUMENTS

EP 0715285 6/1996

(Continued)

OTHER PUBLICATIONS

International Search Report dated Apr. 20, 2009, for PCT/IB2008/003239, filed Nov. 26, 2008.

(Continued)

*Primary Examiner* — Gertrude Arthur Jeanglaud
(74) *Attorney, Agent, or Firm* — Ditthavong Mori & Steiner, P.C.

(57) ABSTRACT

A device for determining the traffic conditions between measurement locations associated with a roadway is provided. The device includes a processor that is capable of determining when a specified measurement location is passed or traversed and measure data as well as start a time period. If a device is traveling towards another specified measurement location but does not reach the location before the time period expires, a new measurement update may be sent by the device to a server. The information in this update may be utilized by the server to determine that there is a slowdown or blockage in traffic and/or that there is a traffic jam between the measurement locations. The device is capable of receiving a traffic update(s) from the server which may specify traffic conditions between the measurement locations. The traffic conditions may indicate that there is a traffic slowdown/blockage between the measurement locations.

38 Claims, 8 Drawing Sheets

FOREIGN PATENT DOCUMENTS

EP 1657692 5/2006

OTHER PUBLICATIONS

Baik Hoh, Marco Gruteser; Hui Xiong and Ansaf Alrabady; Intelligent Transportation Systems—Enhancing Security and Privacy in Traffic-Monitoring Systems; Pervasive Computing; pp. 38-46; Published by the IEEE CS and IEEE ComSoc.
Baik Hoh, Marco Gruteser; Hui Xiong and Ansaf Alrabady; Preserving Privacy in GPS Traces via Uncertainty-Aware Path Cloaking.

* cited by examiner

METHODS, APPARATUSES, AND COMPUTER PROGRAM PRODUCTS FOR TRAFFIC DATA AGGREGATION USING VIRTUAL TRIP LINES AND A COMBINATION OF LOCATION AND TIME BASED MEASUREMENT TRIGGERS IN GPS-ENABLED MOBILE HANDSETS

CROSS-REFERENCE TO RELATED APPLICATIONS

This application is a continuation-in-part of U.S. patent application Ser. No. 11/948,779, filed on Nov. 30, 2007, the contents of which are incorporated herein by reference.

FIELD OF THE INVENTION

Embodiments of the present invention relate generally to utilizing virtual trip lines (VTLs) and global positioning system (GPS) enabled mobile devices of vehicle drivers to infer real-time traffic information on roadways and more particularly, relate to a method, device, and computer program product for preserving the privacy of the vehicle drivers using the GPS enabled mobile devices in a real-time traffic monitoring system.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer and convenience to users relates to real-time traffic monitoring systems. Currently, loop detectors and cameras are being used to monitor traffic conditions, such as traffic congestion, speeds of vehicles, etc. However, usage of loop detectors, consisting of physical inductive coils that are located on roadways and cameras to detect traffic conditions are expensive and may require a sophisticated fixed infrastructure.

Additionally, today's traffic monitoring systems may also consist of probe vehicles to monitor traffic. Probe vehicle based traffic monitoring applications typically provide better coverage with no additional installation or maintenance cost relative to a fixed infrastructure such as loop detectors or cameras. Probe vehicles are capable of monitoring traffic, reporting location and speed of the vehicle to a service provider, such as a traffic monitoring service provider. While probe vehicles may enhance a driver's travel experience, they are vulnerable to compromising the privacy of the driver. For instance, probe vehicles may provide frequent updates that may include the current location of the driver and even the identity of the vehicle's driver to the traffic monitoring service provider. Frequent updates of a vehicle's location might reveal a private location(s) such as a person's home, place of business, etc. and the driver may not want his/her identity known. In this regard, compromising the integrity of the driver's privacy may limit the number of individuals willing to subscribe to a real-time traffic monitoring service.

Anonymous collection of data samples in updates (e.g., where the driver's identity is not provided) sent from the driver's vehicle does not solve the privacy problem since these samples are still vulnerable to place identification (e.g., driver's home) and target tracking of the vehicle due to the spatial and temporal correlation between successive updates.

Another problem with existing traffic monitoring services which typically use installed sensors such as loop detectors and cameras to detect the location of a vehicle arises in situations where there is a significant traffic slowdown between two measurement locations which may utilize installed sensors to determine the location of the vehicle. Due to the traffic slowdown between the two measurement locations, there may be a long time interval in which the vehicle sends an update to the traffic monitoring service provider. For instance, if the traffic in which the vehicle is driving slows down or comes to a complete stop, there may not be any additional update(s) reported to the traffic monitoring service by the vehicle for a long time. In this regard, the traffic monitoring service provider may be unable to detect a slowdown in traffic flow which the traffic monitoring service provider typically would like to detect. Another problem that arises from this inability to detect the traffic slowdown relates to the freshness of data along the roadway where there is a long distance between update measurement locations. For example, if it takes too long to travel between the update locations, then the traffic monitoring service provider's traffic data will not be current because the vehicle must travel the entire distance between the update locations before data is reported again to the traffic monitoring service provider.

An alternative to location based measurements in existing traffic monitoring services consists of performing time based measurements as opposed to location based measurements. While time based measurements continue to report data even if traffic comes to a complete stop or moves very slow, traffic monitoring services utilizing time based measurements suffer from other drawbacks. For instance, in a traffic monitoring service that utilizes time based measurements, as opposed to location based measurements, a vehicle may generate random updates relating to traffic data, which oftentimes creates unnecessary network usage because an update may not be needed by the traffic monitoring service provider during the particular time interval in which the update is generated. As such, a drawback of time based measurements in a traffic monitoring service is that traffic data which may be useless is often generated which wastes network resources. Additionally, usage of time based measurements in a traffic monitoring service often results in invasion of one's privacy given that the vehicle may generate an update identifying sensitive information such as the vehicle's location, speed, etc. during a random time period in which the update is generated. For instance, the location of the update could be the house of the person driving the vehicle which may be sent to the traffic monitoring service provider. In this regard, utilizing time based measurements in traffic monitoring services suffer from the drawback of releasing potential sensitive or private information relating to the user of the vehicle.

Given the above described problems, there is an existing need to enhance the privacy of drivers in a traffic monitoring system and reduce the costs associated with a traffic monitoring system that uses a fixed infrastructure such as loop detectors and cameras as well as to provide an efficient mechanism in which to report updates of traffic data to a traffic monitoring service provider even when traffic slows down or comes to a complete stop.

BRIEF SUMMARY OF THE INVENTION

The exemplary embodiments of the invention are capable of utilizing virtual trip lines which can be dynamically defined to correspond to any geographic area such as for example roads and may be used to monitor traffic in a traffic monitoring system. The traffic monitoring system of the exemplary embodiments of the invention fosters efficiency and seeks to preserve a user/subscriber's privacy by defining virtual trip lines in privacy-insensitive areas. By randomly delaying a time period in which an electronic device reports data associated with crossing or traversing the virtual trip line privacy-sensitive data may be made more secure making it harder for an untrusted server to retrieve one or more reports with the hopes of correlating the reports to track and monitor a user of the electronic device. The virtual trip lines may contain data requiring that the electronic device only report anonymous information, when the device traverses a virtual trip line which provides enhanced security of the user's privacy.

The exemplary embodiments are also capable of utilizing a timed update measurement in combination with usage of virtual trip lines such that if a vehicle with an electronic device exceeds a certain time period traveling between update location measurement points defined by the virtual trip lines, an update may be generate and sent by the electronic device to a traffic monitoring system. As a result, this update is not required to be generated at a particular update location, such as a measurement location which may be defined by a virtual trip line, for example. This time based update that is utilized in the virtual trip lines may provide a device of the traffic monitoring system, such as a server for example, with information that may be used to measure a potential slowdown or stoppage of traffic relating to a particular roadway(s). As such, the problem discussed above relating to useless traffic data and traffic data that is not current for a roadway with a large distance between update measurement locations, which may be defined by virtual trip lines, is also solved by the exemplary embodiments because the traffic monitoring system may receive traffic information from an electronic device without waiting for the electronic device to traverse additional update locations. The exemplary embodiments employ location triggered updates that are associated or linked to one or more virtual trip lines that is traversed or passed by the electronic device along with time based updates if a time period is exceeded in which the electronic device traverses another virtual trip line. This solves the problem discussed above relating to reporting slow or stopped traffic while maintaining the benefit of only reporting measurements, generated by the electronic device, to the traffic monitoring system in situations where these measurements are beneficial or needed.

In one exemplary embodiment, a method and a computer program product for determining traffic conditions between measurement locations which may be defined by coordinates of endpoints of a virtual trip line are provided. The method and computer program product includes receiving one or more geometrical boundaries defined with data. Each geometrical boundary includes a plurality of location descriptors and each of the location descriptors and the geometrical boundaries correspond to a geographic area of the world. The method and computer program product further includes determining that a geometrical boundary was traversed and starting a predetermined time period when the geometrical boundary is traversed. The method and computer program product further includes generating a first set of data when the geometrical boundary is traversed and generating a second set of data when the predetermined time period expires.

In another exemplary embodiment, an apparatus for usage in a traffic monitoring system is provided. The apparatus is capable of receiving information relating to traffic conditions between measurement locations which may be defined by coordinates of endpoints of a virtual trip line. The apparatus includes a processor configured to receive one or more geometrical boundaries defined with data. Each geometrical boundary includes a plurality of location descriptors and each of the location descriptors and the geometrical boundaries correspond to a geographic area of the world. The processor is further configured to determine that a geometrical boundary was traversed and start a predetermined time period when the geometrical boundary is traversed. The processor is further configured to generate a first set of data when the geometrical boundary is traversed and generate a second set of data when the predetermined time period expires.

In another exemplary embodiment, an apparatus for usage in a traffic monitoring system is provided. The apparatus includes a processing element configured to generate one or more geometrical boundaries defined with data. Each geometrical boundary comprises a plurality of location descriptors and each of the location descriptors and the geometrical boundaries correspond to a geographic area of the world. The processor is further configured to send the one or more geometrical boundaries to a terminal which uses the data to trigger generation of information that is associated with the terminal and the geographic area. For instance, the geometrical area may correspond to a segment of a road and upon expiration of the predetermined time period the terminal may generate information identifying its location, the direction it is traveling, the speed or velocity that it is traveling and any other suitable information.

In yet another exemplary embodiment, a method for facilitating traffic monitoring is provided. The method includes generating one or more geometrical boundaries defined with data. Each geometrical boundary comprises a plurality of location descriptors and each of the location descriptors and the geometrical boundaries correspond to a geometrical area of the world. The method further includes sending the one or more geometrical boundaries to a terminal which uses the data to trigger generation of information that is associated with the terminal and the geographic area. For example, the geometrical area may correspond to a segment of a road and upon expiration of the predetermined time period the terminal may generate information identifying its location, the location it is traveling, the speed or velocity that it is traveling and any other suitable information.

BRIEF DESCRIPTION OF THE SEVERAL VIEWS OF THE DRAWINGS

Figure 1:
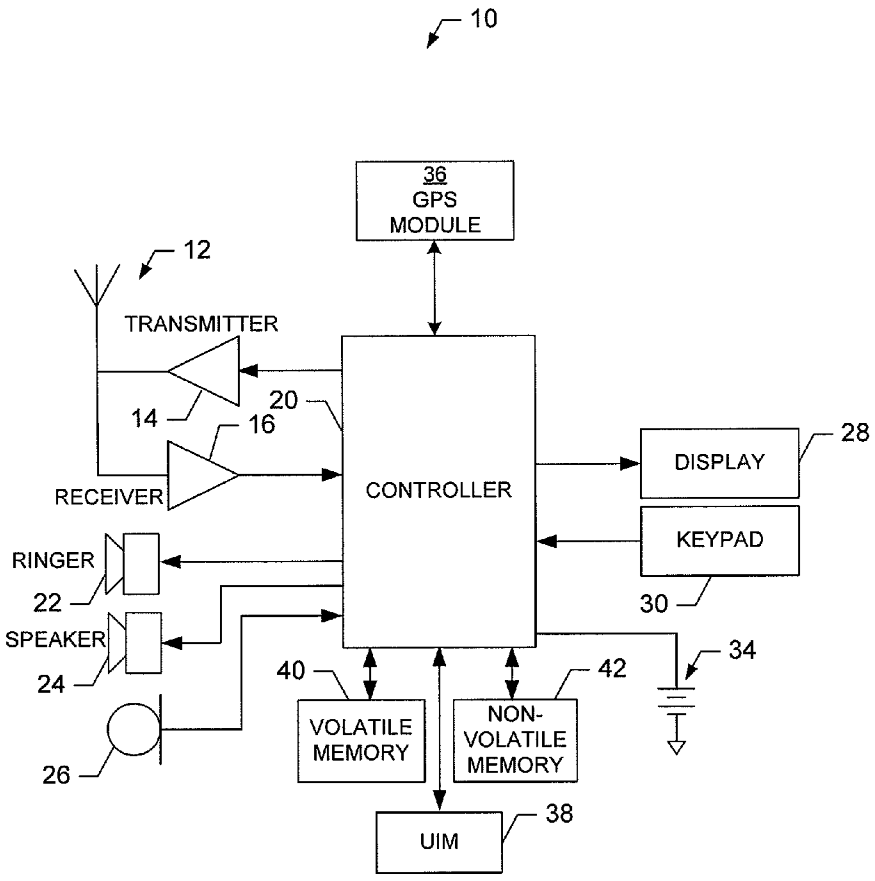
Figure 2:
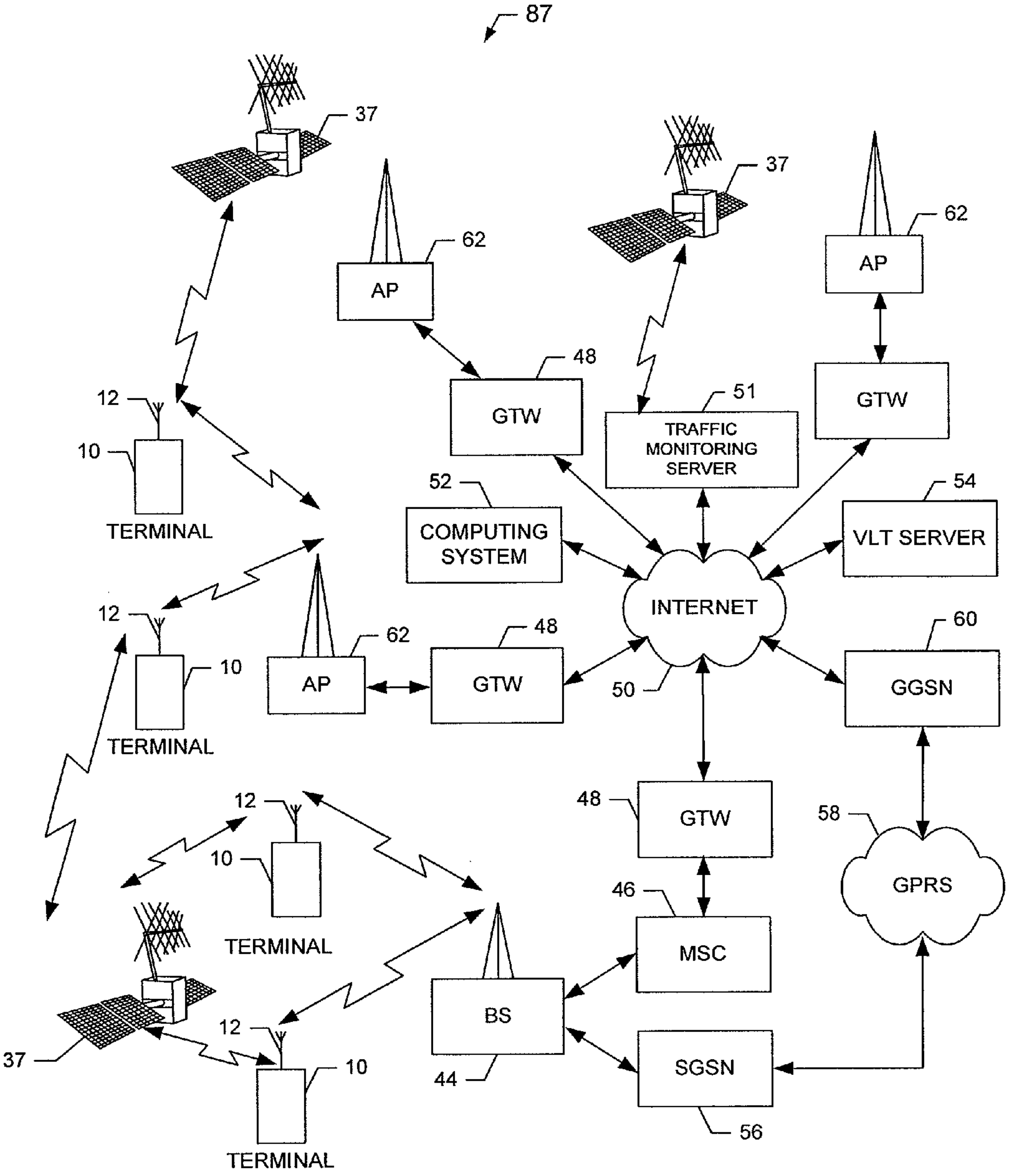
Figure 3:
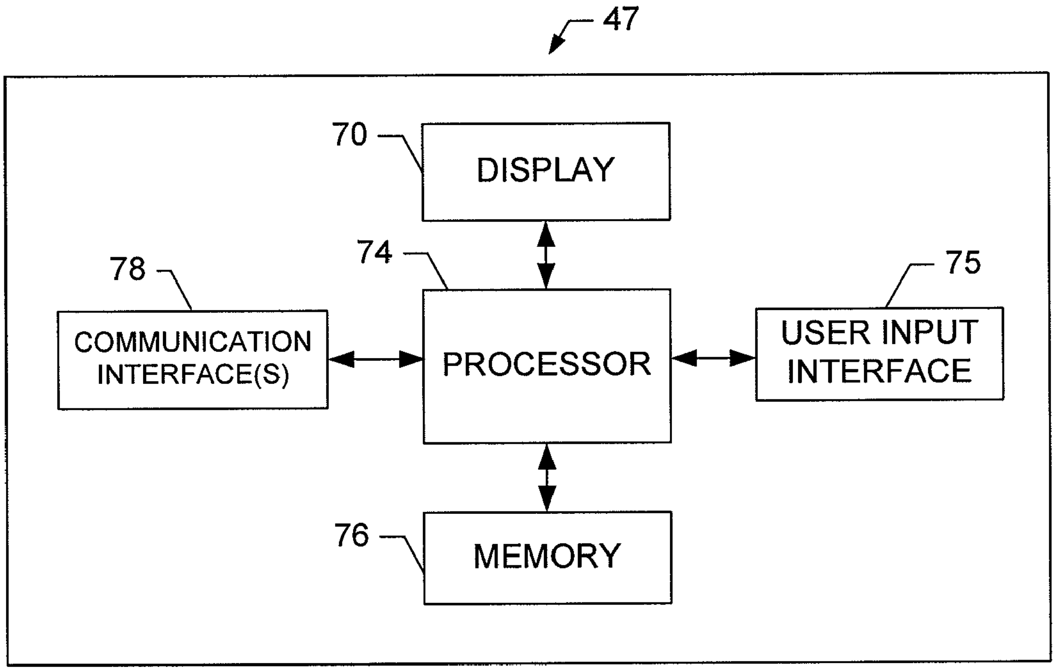
Figure 4A:
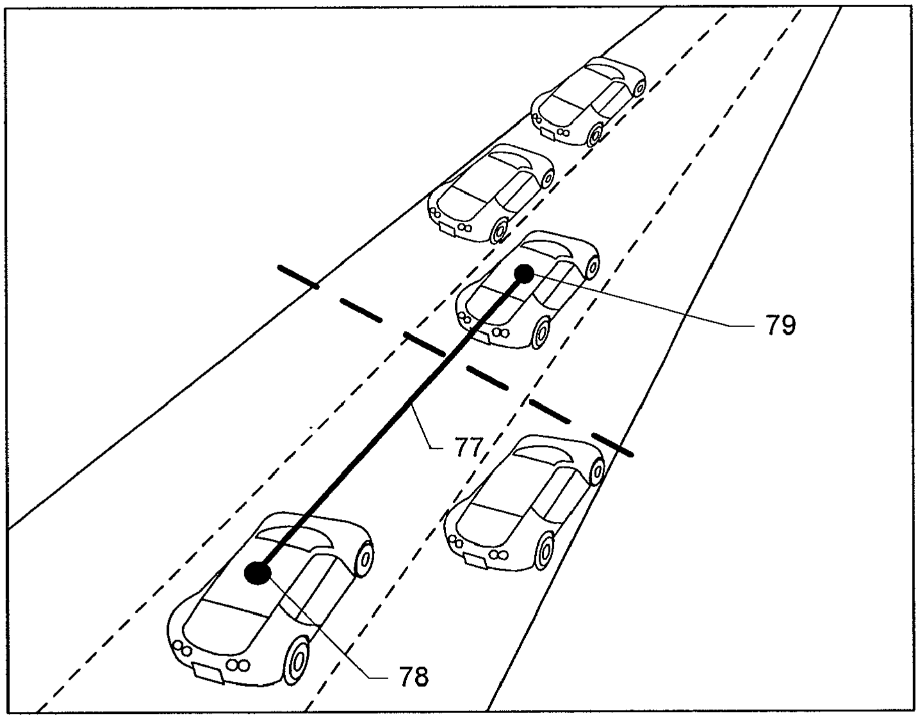
Figure 4B:
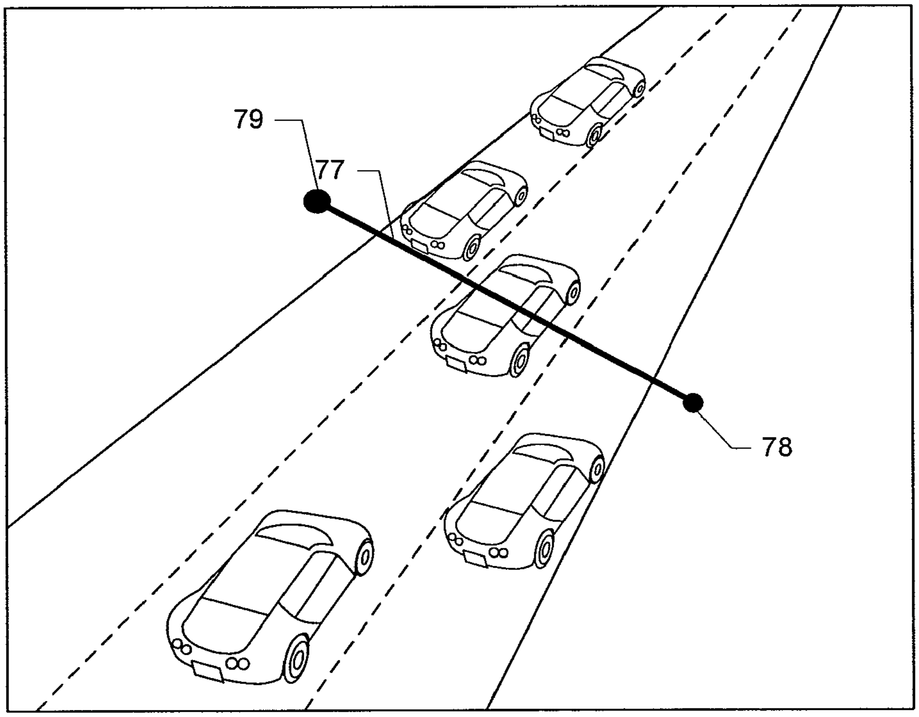
Figure 5:
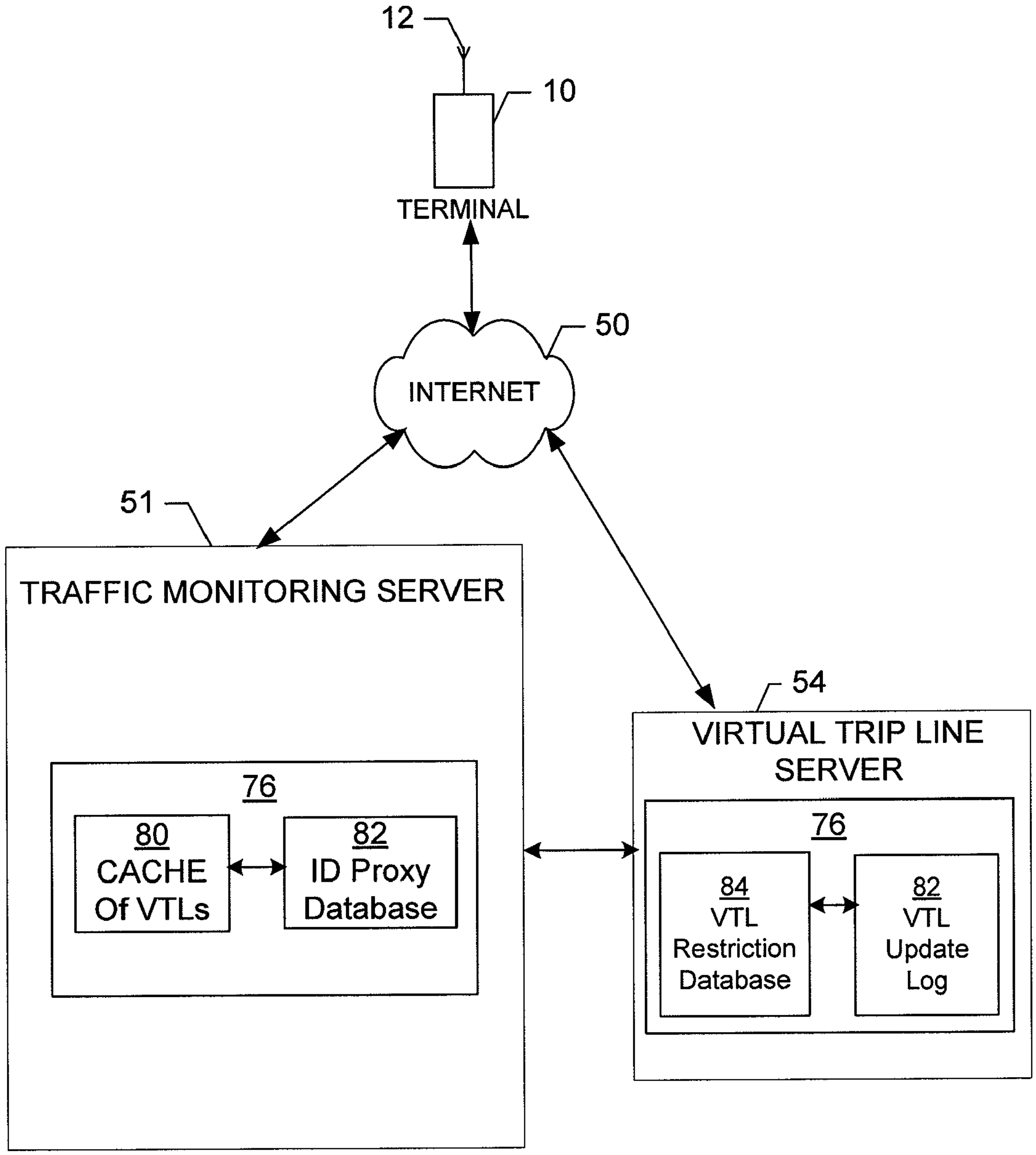
Figure 6:
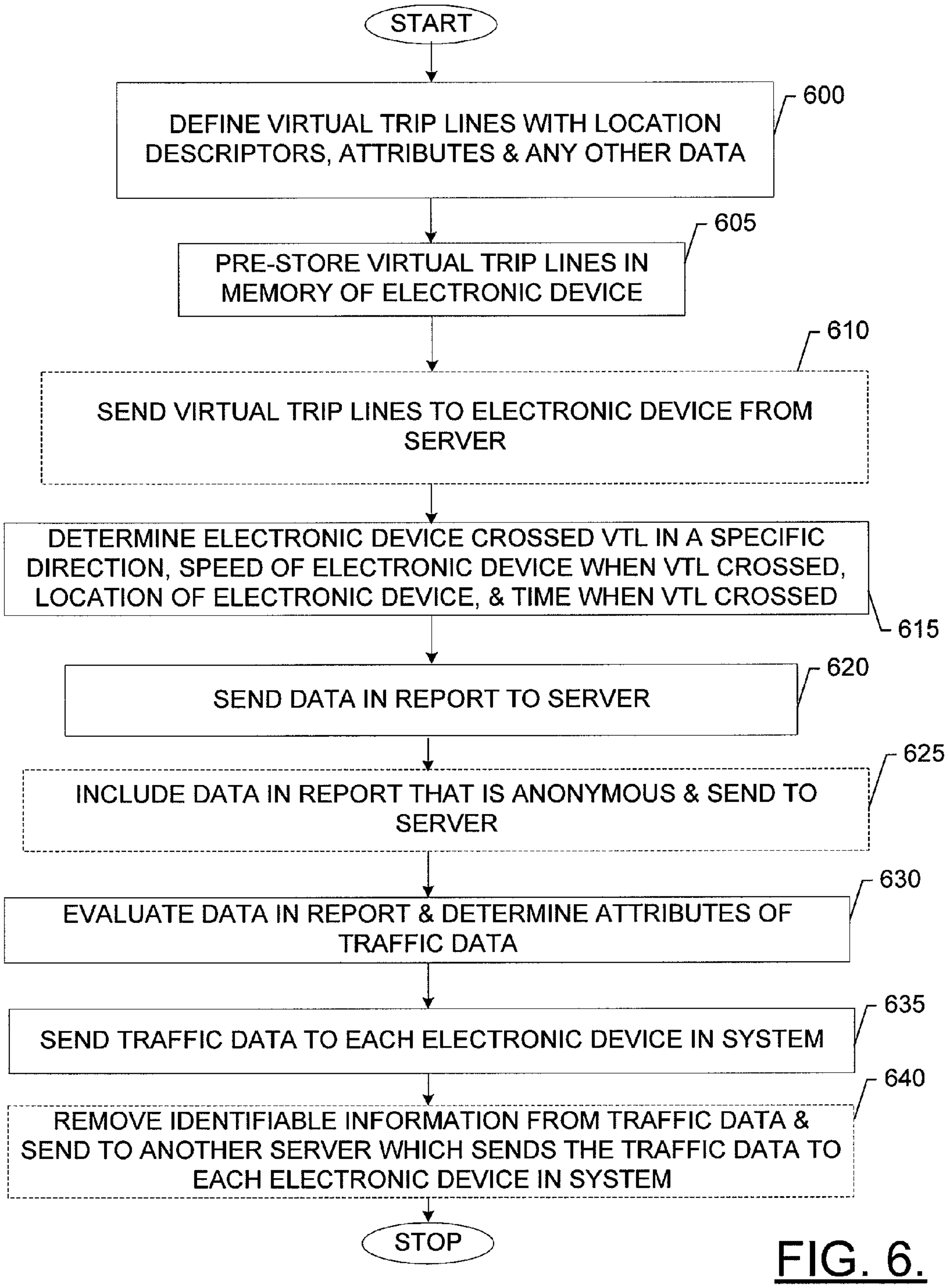
Figure 7:
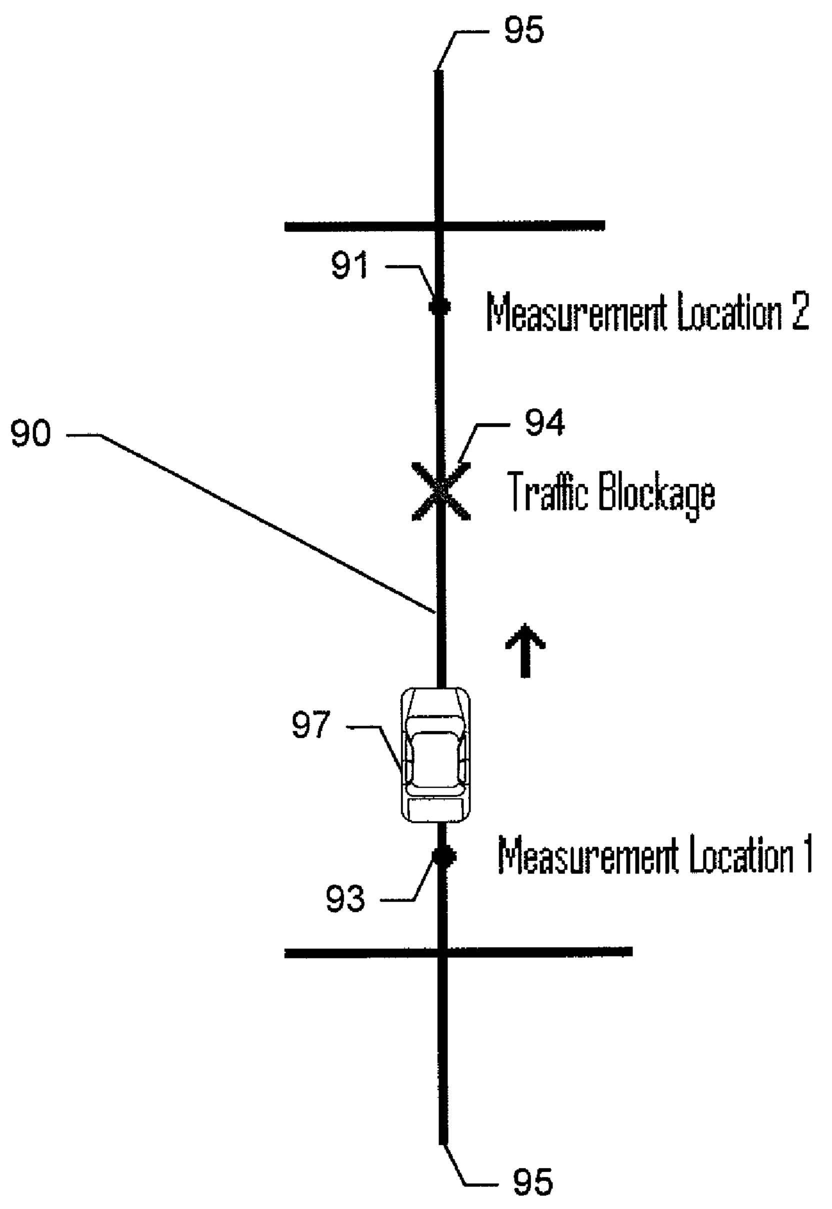
Figure 8:
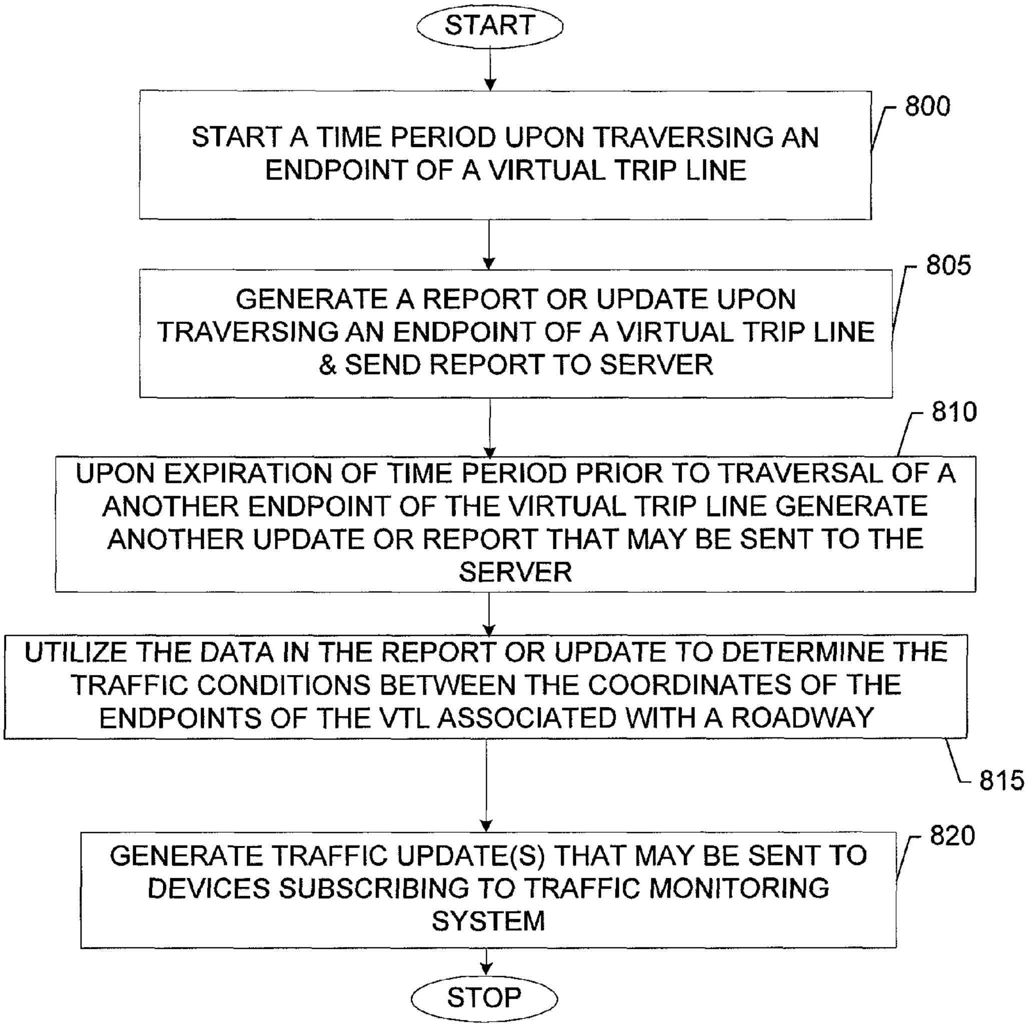

Having thus described the invention in general terms, reference will now be made to the accompanying drawings, which are not necessarily drawn to scale, and wherein:

FIG. 1 is a schematic block diagram of a mobile terminal according to an exemplary embodiment of the invention;

FIG. 2 is a schematic block diagram of a wireless communication system according to an exemplary embodiment of the invention;

FIG. 3 is a schematic block diagram of an entity according to an exemplary embodiment of the invention;

FIGS. 4A & 4B are diagrams of a virtual trip line across a roadway according to an exemplary embodiment of the invention;

FIG. 5 is an illustration of a traffic monitoring system according to an exemplary embodiment of the invention;

FIG. 6 is a flowchart relating to operation of a transmission monitoring system according to an exemplary embodiment of the invention;

FIG. 7 is a diagram illustrating a traffic slowdown along a roadway between virtual trip lines according to an exemplary embodiment of the invention; and FIG. 8 is a flowchart relating to a mechanism for determining traffic conditions between measurement locations such as endpoints of virtual trip lines according to an exemplary embodiment.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries. For example, network devices as shown in FIG. 2 and described below, or indeed, any electronic device involving hardware and software elements would similarly benefit from the present invention. Accordingly, the present invention should not be construed as being limited to applications in the mobile communications industry.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example. The controller 20 may also include functionality to read data associated with one or more virtual trip lines 77 stored in volatile memory 40 and/or non-volatile memory 42. As referred to herein, virtual trip lines may be pairs or sets of location descriptors consisting of data relating to coordinates (e.g., longitude and latitude) of two endpoints in each VTL pair which define geometrical boundaries such as for example line segments, arcs, etc. in the physical (i.e., real) world. It should be pointed out that the coordinates may conform to the Universal Transverse Mercator (UTM) coordinate system, the Military Grid Reference System (MGRS) or any other suitable coordinate system. In an exemplary embodiment, the VTL pairs 77 may consist of respective line segments that are defined such that they are virtually placed across a roadway, highway, interstate, intersection or the like or any other entity or location. That is to say, the two endpoints of the VTL pair(s) may have coordinates which correspond to a line segment that is drawn across the roadway, or some other location/area without physically placing lines, coils, sensors or the like on or near the actual roadway or location/area. (See FIGS. 4A & 4B) Additionally, the VTL pairs may correspond to areas or objects associated with the roadway such as for example mile markers and the like.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 includes the conventional numeric (0-9) and related keys (#, *), and other keys used for operating the mobile terminal 10. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Additionally, the memories can store one or more virtual trip lines. These virtual trip lines may be pre-loaded on the mobile terminal 10 or sent to the mobile terminal 10 from an electronic device such as for example a server (i.e., traffic monitoring server 51) or the like.

The mobile terminal 10 may also include a GPS module 36 which may consist of any means of hardware and/or a combination of hardware and software that is capable of receiving signals from one or more satellites 37 (shown in FIG. 2) and is further capable of determining the location (e.g., longitude, latitude, and altitude) of the mobile terminal 10 as well as the time, speed and direction in which the mobile terminal is traveling based on the signals received from satellite(s) 37. For instance, the GPS module 36 is capable of utilizing a memory device of the mobile terminal 10 to store instructions for execution by the controller in the form of software necessary to determine the location, time, speed and direction in which the mobile terminal 10 is traveling. Additionally, the GPS module 36 is capable of utilizing the controller 20 to transmit/receive, via the transmitter 14/receiver 16 data relating to a vehicle ID, location, time, speed and direction of the mobile terminal (and any other suitable data) to a server such as traffic monitoring server (TMS) 51 and virtual trip line (VTL) server 54.

The controller 20 is also capable of determining when the mobile terminal 10 traverses or crosses the virtual trip line that is defined by location descriptors, i.e., the longitude and latitude coordinates of the virtual trip line(s). For example, based on the signals received from the satellite(s) 37, the GPS module 36 of the mobile terminal 10 is able to determine the mobile terminal's location, e.g., longitude and latitude, and can compare its location to the location descriptors (e.g., longitude and latitude) of the virtual trip lines 77 stored in one or more of the memories 40 and 42 and determine when the mobile terminal passes or crosses a virtual trip line(s) as the mobile terminal 10 moves in a vehicle, for example. The virtual trip lines may have a directionally (e.g., clockwise, or counterclockwise relative to one of the two endpoints 78, 79 associated with the VTL 77) specific attribute assigned to each of them. In this regard, the mobile terminal 10 may be able to detect that it has crossed the virtual trip line if it is moving in the assigned direction or crosses the virtual trip line in the assigned direction.

On the other hand, the virtual trip line may be defined such that if the mobile terminal crosses the virtual trip line in a different direction, (i.e., a direction other than an assigned direction) the controller 20 does not make a determination that the mobile terminal has crossed the virtual trip line. However, it should be pointed out that the virtual trip lines may be defined such that any direction in which the mobile terminal(s) 10 crosses a virtual trip line allows the controller 20 to determine that the mobile terminal 10 has crossed the virtual trip line and the direction in which the virtual trip line was crossed. In any case, each of the virtual trip lines may have a directionality aspect which is used by the controller 20 of the mobile terminal to determine the direction in which the mobile terminal crossed the virtual trip line. In this regard, the controller 20 is capable of determining if the mobile terminal 10 crossed the virtual trip line in an East-West direction or a North-South direction. For instance, the virtual trip line may be defined so that crossing the virtual trip line 77 in one direction indicates a positive direction signifying an East direction (or North direction or any other suitable direction) and crossing the virtual trip line in the opposite direction indicates a negative direction signifying a West direction (or South direction or any other suitable direction). (See FIG. 4B)

Additionally, the virtual trip line may be defined such that one endpoint (e.g., endpoint 78) is positive signifying an East direction (or North direction or any other suitable direction) and another endpoint (e.g., endpoint 79) of the virtual trip line may be defined as negative indicating a West direction (or South direction or any other suitable direction). As such, when the mobile terminal 10 crosses the positive endpoint of the virtual trip line first, the controller 20 is able to determine that the mobile terminal is traveling in an East (e.g., North direction or any other suitable direction) direction whereas when the mobile terminal crosses the negative endpoint of the virtual trip line first, the controller 20 is able to determine that the mobile terminal crossed the virtual trip line in a West (or South direction or any other suitable direction). (See FIG. 4A)

Referring now to FIG. 2, an illustration of one type of system 87 that would benefit from the present invention is provided. The system can be a traffic monitoring system. The system includes a plurality of network devices, any of which may employ embodiments of the present invention. As shown, one or more mobile terminals 10 may each include an antenna 12 for transmitting signals to and for receiving signals from a base site or base station (BS) 44 as well as one or more satellites 37. The satellites 37 are capable of monitoring the location of the mobile terminals and transmitting signals to the mobile terminals that contain data indicating a position (e.g., longitude, latitude, altitude) of the mobile terminals 10. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (one shown in FIG. 2), a traffic monitoring server (TMS) 51 and a virtual trip line (VTL) server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing system 52, the traffic monitoring server 51 and the VTL server 54 across the Internet 50, the mobile terminal 10 and computing system 52 as well as traffic monitoring server 51 and VTL server 54 may be coupled to one another and communicate in accordance with, for example, RF, BT, IrDA or any of a number of different wireline or wireless communication techniques, including LAN, WLAN, WiMAX and/or UWB techniques. The computing system 52, traffic monitoring server 51 and VTL server 54 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques. Moreover, in lieu of coupling the traffic monitoring server 51 and the VTL server 54 across the Internet 50, the traffic monitoring server and the VTL server 54 may be coupled to one another and communicate in accordance with, for example, RF, BT, IrDA or any of a number of different wireline or wireless communication techniques, including LAN, WLAN, WiMAX and/or UWB techniques.

Referring now to FIG. 3, a block diagram of an entity 47 capable of operating as a traffic monitoring server 51 and/or a VTL server 54, is shown in accordance with one embodiment of the present invention. The entity capable of operating as traffic monitoring server 51 and/or VTL server 54 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 3, the entity can include a processor 74 connected to a memory 76. The memory can comprise volatile and/or non-volatile memory, and typically stores content, data or the like. For example, the memory typically stores content transmitted from, and/or received by, the entity. Also, for example, the memory typically stores client applications, instructions or the like for the processor to perform steps associated with operation of the entity in accordance with embodiments of the present invention. In addition, the memory 76 may store one or more virtual trip lines (VTLs), identifiers (IDs) of the mobile terminals such as for example IP addresses, VTL placement restrictions, and any other suitable information.

As described herein, the client application(s) may each comprise software operated by the respective entities. It should be understood, however, that any one or more of the client applications described herein can alternatively comprise firmware or hardware, without departing from the spirit and scope of the present invention. Generally, then, the entity 47 can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective network entity (e.g., computing system, traffic monitoring server, VTL server, etc.) or more particularly, for example, a processor 74 of the respective network entity.

In addition to the memory 76, the processor 74 can also be connected to at least one interface or other means for displaying, downloading, transmitting and/or receiving data, content or the like. In this regard, the interface(s) can include at least one communication interface 78 or other means for downloading, transmitting and/or receiving data, content or the like. In this regard, the communication interface 78 is capable of sending an electronic device such as a mobile terminal 10, one or more VTLs that may be stored in a memory of the mobile terminal 10. The communication interface(s) can include a first communication interface for connecting to a first network, and a second communication interface for connecting to a second network. In addition to the communication interface(s), the interface(s) can also include at least one user interface that can include one or more earphones and/or speakers, a display 70, and/or a user input interface 75. The user input interface, in turn, can comprise any of a number of devices allowing the entity to transmit and/or receive data to/from a user, such as a microphone, a keypad, a touch display, a joystick, image capture device (e.g., digital camera) or other input device. For example, the user input interface 75 may be utilized to define the VTLs which may include but is not limited to defining the coordinates of the VTLs, attributes and/or restrictions associated with the VTLs and the like.

Referring to FIGS. 4A & 4B, an illustration of a virtual trip line across a roadway is provided. As can be seen in FIG. 4A, the virtual trip line 77 has two endpoints 78 and 79 corresponding to location descriptors arranged within a lane of the roadway in which vehicles, some of which have mobile terminals 10, are crossing the virtual trip line 77. As shown in FIG. 4B, the virtual trip lines may be defined such that they span across all of the lanes of the roadway (e.g., the three lanes in the roadway of FIG. 4B) As discussed above, when the mobile terminal 10 crosses the virtual trip line 77, the controller 20 of the mobile terminal 10 is able to determine that it crossed a particular virtual trip line(s), the direction in which the virtual trip line was crossed and the controller is capable of determining the location of the mobile terminal 10 as well as the speed of the mobile terminal and sending this information to the traffic monitoring server 51 in a report, for example. The report may, but need not, also include information identifying the user of the mobile terminal as well as the data identifying the mobile terminal 10 itself. (See discussion below) The controller 20 may also encrypt the data in the report by executing a cipher algorithm that is stored in a memory of the mobile terminal 10.

Referring now to FIG. 5, a system for monitoring traffic conditions is provided. The system includes a traffic monitoring server 51 in communication with a mobile terminal 10 as well as virtual trip line server 54. The traffic monitoring server 51 may be any device or means in hardware and/or a combination of hardware and/or software that is capable of storing virtual trip lines in a memory element 80 of memory 76 within the TMS 51. The memory element 80 may be a volatile memory, non-volatile memory or a cache memory. As noted above, the virtual trip lines may be defined and generated utilizing a keypad or other input device of user input interface 75. The memory element 80, also referred to herein as Cache of VTLs, is capable of storing one or more street maps. The street maps may be digital and associated with or linked to one or more of the VTLs. In this regard, the VTLs may be defined and identified on the street maps. The VTLs may be associated with the street maps by one or more defined rules or formulas as well as on the basis of placing the VTLs on the street maps. For instance, a program or application or alternatively a user (e.g., network operator) of the traffic monitoring server 51 may define a rule(s) such that one or more virtual trip lines are placed on a street map at a particular location, for example, 30 meters from an intersection. In this regard, the TMS 51, may define a VTL such that once the intersection is crossed or traversed by the mobile terminal 10, the VTL is placed on the street map 30 meters from the intersection. On the other hand, the application, program or user of the TMS 51 may place the VTLs on the street maps based on the coordinates (e.g., latitude and longitude) of the VLTs. In this regard, the coordinates of the VTL may be matched with the corresponding areas on the street maps and placed directly on or superimposed on the street map. In the foregoing example, the VTL would be placed 30 meters from the intersection based on its defined coordinates for example, as opposed to a defined rule. The street maps associated with the VTLs provide location references for various roadways. The traffic monitoring server 51 is capable of transmitting VTLs to the mobile terminals 10 and the virtual trip line server 54, which may be stored in a memory 40, 42 of the mobile terminal 10 as well as a memory of the VTL server 54 such as the VTL Update Log 82, respectively. The VTL Update Log may keep an active list of all virtual trip lines in the transmission monitoring system 87 and track any changes that are made to them. The virtual trip line server 54 may be any device or means in hardware and/or a combination of hardware and/or software that is capable of transmitting/receiving data to/from the traffic monitoring server 51 and is further capable of transmitting/receiving data to/from the mobile terminals. The data transmitted/received to/from the TMS 51 and the mobile terminals may be traffic related data as discussed below. In an exemplary alternative embodiment, the traffic monitoring server 51 and the virtual trip line server 54 may be embodied in a single component such as a computing device or an integrated circuit(s) such as for example, an application specific integrated circuit (ASIC).

The traffic monitoring server 51 is further capable of receiving a report from the mobile terminals 10 once the mobile terminals pass or cross a VTL. For instance, when the mobile terminal 10 crosses the location descriptors (e.g., latitude of 39.3° North, and a longitude of 76.6° West) associated with the pairs of virtual trip lines, the mobile terminal utilizes the controller 20 to generate a report that is sent to the traffic monitoring server 51. This report may be stored in memory 76. The report received from the mobile terminal(s) 10 may include, but is not limited to, an indication that a respective virtual trip line has been crossed, and may include data indicating the position, speed and direction of the mobile terminal 10. As noted above, the report received from a respective mobile terminal 10 may be encrypted. In this regard, the processor 74 of the TMS 51 is capable of executing an algorithm to decrypt the data in the report such that it is accessible by the TMS 51. If the TMS server 51 successfully decrypts the data in the report, the TMS 51 may determine that the user of mobile terminal sending the report is a subscriber of the traffic monitoring system and has a right to use its traffic monitoring services. On the other hand, if the TMS 51 is unable to decrypt the data in the report, the TMS 51 is capable of determining that the report is suspicious and may be sent from a non-subscriber or an untrustworthy server seeking to obtain information from the TMS 51. In this regard, if the TMS 51 cannot decrypt the data in the report, the report is ignored and deleted.

Based on the data in the report, the traffic monitoring server 51 is capable of utilizing processor 74 to determine, the number of vehicles that are passing the respective virtual trip line that is drawn across a roadway per minute, and the average speed of the vehicles passing the virtual trip line, as well as the traffic density, and any other suitable data. For instance, to determine the traffic density and volume at or near a respective pair of VTL lines, the traffic monitoring server 51 is capable of applying Greenshields' equation i.e., $v=(v \times f)\times(1-k/k \times j)$, where "k" is the traffic density, "v" is the velocity, $(v \times f)$ is the free flow speed and $(k \times j)$ is defined as jam density for a given road. The processor 74 of the traffic monitoring server 51 is capable of solving Greenshields' equation to determine the traffic density "k" by using the value of the velocity received from the mobile terminal 10 in the report. As noted above, the traffic monitoring server 51 is able to utilize data in the report from a mobile terminal 10 in order to estimate how many vehicles are passing the VTL per minute. For instance, the traffic monitoring server 51, may also receive data from a loop detector, having for example magnetic coils or the like that are physically located across the roadway. The loop detector is able to count the actual number of vehicles that pass or cross the magnetic coils per minute. This data may be sent to traffic monitoring server 51 as the actual number of vehicles (e.g. 200) that passed the loop detector across the roadway. A virtual trip line can be defined to have the same endpoints as the endpoints of the loop detector and a line segment drawn across the roadway along the same path as the magnetic coil that is physically laid across the roadway.

Using the actual number of vehicles that crossed the loop detector, the TMS 51 is able to determine a default ratio of the number of mobile terminals that are participating in the traffic monitoring system. For example, the traffic monitoring server 51 may determine that at the location of the VTL, that it received reports from a number of vehicles, such as for example, 20 vehicles (having a mobile terminal 10) in the past minute and based on the number of received reports within the last minute, the TMS 51 is able to determine an estimated default ratio of the number of vehicles that are participating in the traffic monitoring system. For instance, in the example above, the traffic monitoring system may determine that one in ten (i.e., 20 vehicles reporting/200 actual vehicles crossing the loop detector=1/10) vehicles are participating in the traffic monitoring system. As such, in places where there are virtual trip lines defined but where no loop detector(s) or the like is physically laid across the roadway, the traffic monitoring server 51 is capable of utilizing the default ratio (e.g., 1/10) to determine the number of vehicles that are crossing a VTL(s) per minute.

For instance, if the TMS 51 received for example, 30 reports from mobile terminals 10 that crossed a particular VTL per minute in a location associated with a roadway that did not also have a loop detector or the like physically located across the particular roadway, the TMS 51 is capable of multiplying the number of reports received (e.g., 30) times the inverse of the default ratio (e.g., 30×10/1) and estimate the number of vehicles passing the respective VTL per minute (i.e., 300 vehicles in this example). Additionally, the traffic monitoring server 51 may send the data associated with the estimated number of vehicles that are passing the respective virtual trip line per minute, the average speed of the vehicles passing the virtual trip line, the traffic density and volume as well as any other suitable data to electronic devices such as for example, mobile terminals 10, computing systems 52, etc. of subscribers of the traffic monitoring system. Additionally or alternatively, the traffic monitoring server 51 may send the virtual trip line server 54 the data associated with the estimated number of vehicles that are passing the respective virtual trip line per minute, the average speed of the vehicles passing the virtual trip line, the traffic density and volume as well as any other suitable data and the virtual trip line server 54 may send this data to electronic devices such as for example, mobile terminals 10, computing systems 52, etc. of subscribers of the traffic monitoring system. In situations in which the TMS 51 has removed the identification information from the report, in the manner discussed above, the virtual trip line server is typically unable to determine the personal information of the user of the mobile terminal and which mobile terminal that the report was sent from. In this regard, the user's personal information and privacy is more secure.

It should be pointed out that while the mobile terminal 10 is capable of sending a report to the traffic monitoring server 51 when it crosses a virtual trip line(s), the mobile terminal is also capable of performing one or more local actions, i.e., actions occurring on the mobile terminal 10. For purposes of illustration and not of limitation, when the mobile terminal 10 passes a VTL, the mobile terminal is capable of generating a message that may be shown on display 28 and/or starting an application program stored on the mobile terminal 10 or performing any other suitable action. For example, when the mobile terminal 10 passes a virtual trip line the speaker 24 of the mobile terminal 10 may generate an audible beep. Additionally, when the mobile terminal 10 crosses a particular virtual trip line, the mobile terminal 10 may send a warning message to the display 28 of the mobile terminal 10 notifying the user that the vehicle containing the mobile terminal just entered a particular area such as a school zone, for example. In addition, when the mobile terminal 10 crosses a VTL, it may send data to other mobile terminals 10 (i.e., non-local actions) or electronic devices other than the traffic monitoring server 51. For instance, the mobile terminal 10 may send the report to another mobile terminal 10, computing system 52 or any other electronic device. Additionally or alternatively, for example, the mobile terminal 10 may send another mobile terminal 10, computing system 52 or electronic device a message, picture, video clip, audio clip, animation, or the like when the mobile terminal crosses a VTL or any other suitable data. In this regard, the message may include, but is not limited to, a text message such as a short message service (SMS) message or a multimedia messaging service (MMS)

message. In an alternative exemplary embodiment, the mobile terminal 10 may send the report, and/or message by performing a web transaction such as an Hypertext Transfer Protocol (HTTP) post, to a web service running on any traditional computer or mobile device.

The virtual trip lines 77 may be static and in this regard may be pre-loaded in one or more of the memories 40 and 42 of the mobile terminal 10, as discussed above. Additionally or alternatively, the virtual trip lines may be sent to the mobile terminal 10 from an electronic device such as for example traffic monitoring server 51 or the mobile terminal 10 may download the virtual trip lines from the traffic monitoring server 51. Moreover, the virtual trip lines may be downloaded/sent to the mobile terminal 10 from the traffic monitoring server 51 when the mobile terminal enters a geographic region such as a particular city, state or the like. In this regard, the mobile terminal 10 is able to obtain relevant virtual trip lines for the specific geographic region that the mobile terminal is within. The virtual trip lines may also be dynamic in the sense that a person such as, for example, an operator of the traffic monitoring server 51 or an electronic device such as the TMS server 51 itself may dynamically define and establish the virtual trip lines. For example, an operator of the TMS 51 could determine that traffic is becoming congested in one or more geographic regions and utilize the user input interface 75 to define virtual trip lines 77 for corresponding roadways in these regions. In this regard, one or more virtual trip lines may be dynamically generated. Additionally, the traffic monitoring server 51 is capable of receiving signals from satellites 37 and storing these signals in memory 76 and the processor 74. The signals received from the satellite(s) 37 may correspond to traffic data or traffic conditions in a geographic area(s). The processor 74 is able to retrieve these signals and determine that a virtual trip line(s) should be generated for particular roadway, for instance a roadway that is congested with traffic but one in which there were not any previous virtual trip lines defined for the roadway. Also, the processor 74 may change the location descriptors of existing virtual trip lines such that the coordinates correspond to a different roadway or the like. In this regard, the traffic monitoring server 51 is capable of dynamically generating one or more virtual trip lines.

The traffic monitoring server 51 is capable of sending the dynamically generated virtual trip lines to the mobile terminal 10 which may be stored in one or more of memories 40 and 42. In this regard, the virtual trip lines are pushed from the TMS 51 to the mobile terminal 10. Additionally or alternatively, the mobile terminal 10 may periodically (e.g., 1 minute) check for updates of virtual trip lines generated by the TMS 51 or an operator of the TMS 51. For instance, the controller 20 of the mobile terminal 10 may send the TMS 51 a request for new or changed virtual trip lines and if there are new or changed virtual trip lines, the TMS 51 is capable of sending the new or changed virtual trip lines to the mobile terminal. As such, the mobile terminal 10 is able to pull the virtual trip lines from the TMS 51. If there are no new or changed virtual trip lines in the TMS 51, the TMS 51 is capable of sending the mobile terminal a message to this effect.

The virtual trip lines 77 may also be defined as having an attribute(s) associated with them. In this regard, either operator of the TMS using user input interface 75 or the processor 74 of TMS 51 may define the virtual trip lines with location descriptors as well as with any number or type of attributes. For example, the virtual trip lines are capable of being defined according to a time of day (e.g., 3:00 PM to 4:00 PM) attribute or a time of week attribute, in which case, these virtual trip lines would only be valid and detectable by the mobile terminal during the specified time of day (i.e., 3:00 PM to 4:00 PM in this example) or time or week. Additionally, the virtual trip lines 77 may be defined with attributes based on a category of a user of the mobile terminal 10. For instance, if the user of the mobile terminal 10 is a commercial truck driver, the user's mobile terminal will be able to detect when it crosses this virtual trip line whereas a mobile terminal of a non-commercial truck driver would not be able to detect that it crossed a virtual trip line defined for commercial truck drivers. It should be pointed out that the above attributes (i.e., time of day, time of week, category of user of mobile terminal 10) of the virtual trip lines are for illustrative purposes and in this regard the virtual trip lines may be defined by any suitable attributes.

It should also be pointed out that the controller 20 of the mobile terminal 10 may include information in the report that it sends to the TMS 51 indicating that the data in the report is anonymous in the sense that it does not specify any information relating to the identity of the user (e.g., Bob's vehicle having mobile terminal 10) of the mobile terminal 10 or any identifying information relating (e.g., Internet Protocol (IP) address of the mobile terminal) to the mobile terminal 10 that is sending the report. On the other hand, the controller 20 may include data in the report identifying the user of the mobile terminal 10 such as the personal information associated with the user for example, the user's name, home and/or work address, telephone numbers, e-mail addresses, etc. Additionally or alternatively, the controller 20 is capable of including data in the report identifying the mobile terminal 10 that is sending the report. The ID proxy database 82 of the memory 76 of the TMS 51 is capable of storing vehicle identifiers (IDs), (e.g., license plates) of vehicles having mobile terminals 10 relating to its subscribers as well as each of the subscriber's personal information including but not limited to, the subscriber's name, home and/or work address, telephone numbers, e-mail addresses and identifying information of mobile terminals 10 of the subscribers such as International Mobile Equipment Identity (IMEI) codes and IP address of the mobile terminals and the like. It should be pointed out that the user of the mobile terminal 10 may utilize the keypad 30 to select a user setting(s) on the mobile terminal 10 that either makes the data in the report sent from the mobile terminal 10 to the TMS 51 be identifiable or anonymous. Additionally or alternatively, the traffic monitoring server 51 may send the mobile terminal a user setting(s) that makes the data in the report be identifiable or anonymous. Furthermore, attributes of the virtual trip lines 77 may be defined requiring the data in the report to be identifiable or anonymous. For instance, a virtual trip line may be defined with one or more attributes requiring that the data in the report be identifiable whereas another virtual trip line may be defined with attributes specifying that the data in the report should be anonymous.

When the data in the report identifies the user and/or the mobile terminal that it is sending the report, the processor 74 of traffic monitoring server 51 is capable of comparing this identification information with information stored in the ID proxy database 82 and when there is matching identification data in the report and the ID proxy database, the processor 74 is capable of removing the identification information from the data in the report. The processor 74 of the TMS 51 is also capable of sending this report(s), without the identification information to the virtual trip line server 54. In this regard, the user's personal information and privacy is more secure.

Usage of the traffic monitoring system 87 of the exemplary embodiments of the present invention fosters an efficient traffic monitoring system in which electronic devices such as mobile terminals 10 may be monitored by the traffic monitoring server 51 in an efficient manner and the TMS 51 is capable of efficiently receiving reports from the mobile terminals 10 as the mobile terminals cross the strategically defined virtual trip lines 77. In this regard, the traffic monitoring system 87 is a much more efficient system than a system which monitors where each electronic device is located at all times. Additionally, the traffic monitoring system 87 is respects the privacy of the user's of the mobile terminals 10. For instance, the virtual trip lines 77 may be defined so that they have location descriptors in appropriate public places for example on roadways or the like, as opposed to a driveway of a user's home, place of employment of the user or other private area or the like. In this regard, the traffic monitoring system 87 preserves the privacy of the user of mobile terminals 10 better than a system which periodically monitors the status or location of the mobile terminals in a vehicle, since periodically (e.g., every 2 minutes) monitoring the location of an electronic device in a vehicle that subscribes to a traffic monitoring system may result in providing a location to a traffic monitoring service provider which may be private to the user of the electronic device. For instance, requiring the electronic device to periodically send an update may result in the electronic device reporting that it is located in a driveway of the user of the electronic device's home, parking lot of the user's place of employment or another place in which the user may not wish to disclose his/her location. In this regard, a traffic system which periodically monitors the location of the electronic device may lead an enormous amount of sensitive data of the users subscribing to the system that should be protected.

In contrast, by using the virtual trip lines of the exemplary embodiments of the present invention, so long as the virtual trip lines are defined with location descriptors in public places, the TMS server 51 may not obtain information that the mobile terminal is located at the user's home or another private place that is sensitive to the user when the user's mobile terminal crosses the virtual trip line(s).

It should be pointed out that while the virtual trip lines 77 have been described with reference to location descriptors associated with roadways that this discussion is for illustrative purposes and not of limitation. In this regard, the virtual trip lines 77 may be defined with location descriptors corresponding to other locations such as museums, restaurants and any other suitable public places. Moreover, the mobile terminals are not required to be contained within a vehicle or the like to operate in the system 87. For example, if a virtual trip line is defined with location descriptors corresponding to a museum, a user such as a pedestrian having the mobile terminal 10 which crosses the virtual trip line may enable the mobile terminal 10 to send its location information to a server such as, for example, TMS 51. Since the virtual trip lines in this regard relate to location descriptors of public places as opposed to residences of a user for example, the privacy of the user is typically protected.

The virtual trip lines 77 may be further defined by placement restrictions. In this regard, a user or operator of the traffic monitoring server 51 may utilize the user input interface 75 to define placement restrictions for a respective virtual trip line(s). Furthermore, the processor 74 of TMS 51 may execute a program to define placement restrictions for a respective virtual trip line(s). Additionally or alternatively, a user or operator of the virtual trip line server 54 may utilize the user input interface 75 to define placement restrictions for a respective virtual trip line, which may be stored in virtual trip line restriction database 84. Also, the processor 74 of virtual trip line server 54 may execute a program to define the placement restrictions for the virtual trip lines. The TMS 51 and the virtual trip line server 54 may also exchange virtual trip line restrictions between each other. In this regard, in cases in which the virtual trip line server 54 subscribes to the TMS 51, and the TMS 51 does not apply virtual trip line restrictions, the virtual trip line server may request that the TMS 51 does so by sending the TMS 51 virtual trip line restrictions to apply to virtual trip lines stored at the TMS 51. Placement restrictions defined for virtual trip lines may be defined such that the location descriptors of the virtual trip lines may correspond to public places/locations (e.g., public highway or interstate) as opposed to private locations (e.g., user's home, driveway of user's home, cul-de-sac of residential neighborhood, etc.). As such, when the mobile terminal 10 crosses a virtual trip line having placement restrictions, there is typically no privacy-invasive data provided to the traffic monitoring server 51 in the report that it receives from the mobile terminal 10. In this regard, the TMS 51 is able to make the data in the report received from the mobile terminal 10 anonymous when appropriate.

Additionally, the mobile terminal 10 may temporally shift the moment in time in which it sends the report to the traffic monitoring server 51. As referred to herein "temporally shifting" means waiting a random period (e.g., 7 seconds) of time before sending the report to the traffic monitoring server 51. By temporally shifting the period of time in which to send the report to the TMS 51, the data in the report is typically more secure, since a server such as the TMS 51 may not be able to determine the exact location of the car at the time that the report is actually received at the TMS 51. As a result, the exact location of the mobile terminal may be unknown at the time the report is actually received by the TMS 51. The TMS 51 may send the mobile terminals in the system 87 an instruction to temporally shift the reporting of the data in the report which is received and carried out by the controller 20. The user may also select a user setting using keypad 30 to temporally shift the reporting of the data to TMS 51. Temporally shifting the report so that a server does not know the exact location of a mobile terminal provides further protection of the user's privacy. Consider a situation in which the Highway Department oversees a server such as TMS 51. A user would likely not want the Highway Department to know its exact location at which it was traveling at a certain speed.

In an alternative exemplary embodiment, the data in the report that is sent to the TMS 51 may also be quantized. In this regard, the measured or determined data in the report may be categorized as opposed to reporting actual values. For instance, the speed in which the mobile terminal is traveling, for example, in a vehicle may be categorized as opposed to reporting the actual speed of the mobile terminal 10. For example, when the controller 20 determines that the mobile terminal is traveling at a speed of 44 miles per hour, (mph) the controller 20 may quantize the actual speed of the mobile terminal and categorize the speed data in the report as "going less than 45 mph" or any other suitable characterization without reporting the actual speed in which the mobile terminal is traveling. As another example, in a situation in which the speed limit is 55 mph in an area associated with a virtual trip line, the speed in which the mobile terminal is traveling may be quantized and categorized as "50 mph and above." And in a situation in which the speed limit is 45 mph in an area associated with a virtual trip line, the speed in which the mobile terminal is traveling may be quantized and characterized as "40 mph and above." The categories in these examples are appropriate given that the top speed categories are just below the speed limit and up. By quantizing and categorizing the data in the report, the user of the mobile terminal 10 is not forced to report the actual speed in which he/she were traveling. The TMS 51 may send the mobile terminal 10 a user setting to quantize the data in the report. Alternatively or additionally, the user of mobile terminal 10 may utilize the keypad 30 to select a user setting to quantize the data in the report.

The mobile terminal 10 may also report the data to the TMS 51 probabilistically. In this regard, the mobile terminal may decide to send the data to the TMS 51 some of the time but not each time that the mobile terminal passes a virtual trip line. For instance, a user setting may be defined (in a manner analogous to that discussed above) in which the probability of sending reports to the TMS 51 may be adjusted according to any number of suitable parameters. For instance, the user setting may be defined based on a speed parameter and as such may defined as "the faster the mobile terminal is traveling, the less likely that the mobile terminal 10 will send a report to traffic monitoring server 51." Additionally, the user setting may be defined to randomly determine when to send the report from the mobile terminal to the TMS 51. The probability of sending a report may be defined in any suitable manner and is not limited to the above examples. This user setting may be sent from the traffic monitoring server 51 to the mobile terminal 10 or it may be pre-loaded in a memory of the mobile terminal 10 and accessible by the user utilizing the keypad 30 of the mobile terminal 10. Alternatively, the TMS 51 may send the mobile terminal an a user setting instructing the mobile terminal not to send the TMS another report until a predetermined time period has expired (e.g., 7 minutes) or the TMS may send the mobile terminal a user setting which instructs the mobile terminal not to send any additional reports until the mobile terminal 10 has traveled a predetermined distance (e.g., 25 miles). Sending reports some of the time from the mobile terminal to the TMS 51 in the manner discussed above makes it more difficult for an untrusted server to retrieve the reports and utilize the reports and determine where the reports are originated from so as to track a person as well as obtaining any private information relating to the user or the user's mobile terminal that may be contained within the reports.

The virtual trip lines 77 of the exemplary embodiments of the present invention may serve many practical uses. For instance, the virtual trip lines may be defined with location descriptors which correspond to a toll road, toll booth, toll station or the like. In this regard, when the mobile terminal 10, which may be in a vehicle, crosses the respective virtual trip line associated with the toll road, toll booth, toll station or the like, the mobile terminal 10 may generate an audible message that may be heard via speaker 24 or a message that is viewable on display 28 notifying the user that the mobile terminal is entering an area relating to a road for which a driver pays a toll, i.e., a fee for using the road. Additionally, in the case of a virtual trip line associated with a toll road, toll booth/station or the like, the user of the mobile terminal may set up an account with the traffic monitoring server 51 to automatically deduct the fee for using the toll road from the account of the user so that the user's vehicle containing mobile terminal 10 may proceed through a toll booth, toll station or the like. To effectuate payment of the toll fee, data in the report sent from the mobile terminal 10 to the traffic monitoring server 51 should typically identify the user, so that the user's identification information may be matched to the user's account information at the TMS 51. When the data in the report matches the user's account information, the traffic monitoring server 51 is typically capable of deducting the monetary value (e.g., $1.00) of the toll fee from the user's account and sending a message, such as for example a receipt or an electronic receipt, to the mobile terminal 10 indicating that the monetary value corresponding to the toll fee was deducted from the user's account.

Additionally, as briefly mentioned above, the virtual trip lines 77 may be defined to provide warning or caution messages to the user's mobile terminal 10. For example, the virtual trip lines may be defined with location descriptors associated with school zones, construction zones, areas with hazardous conditions, for example a bridge containing patches of ice or any other suitable location descriptors. When the mobile terminal 10 crosses a virtual trip line having location descriptors associated with a school zone, the mobile terminal 10 may generate a message such as an audible message that may be heard via speaker 24 or a viewable message that may be shown via display 28 which notifies the user that he/she is now entering the school zone. In this regard, crossing the virtual trip line may enable the mobile terminal to perform a local action, i.e., generate a message notifying the user that he/she is entering the school zone. However, it should be pointed out that this message i.e., notifying the user that he/she is entering the school zone may be sent or pushed from the TMS 51 to the mobile terminal.

As another example, when the mobile terminal 10 crosses a virtual trip line associated with a hazardous condition such as for example an icy bridge, the mobile terminal 10 may perform a local action and generate an audible or viewable message, in the manner discussed above, which may notify the user that he/she is entering the icy bridge. Alternatively, the message i.e., notifying the user that he/she is entering the icy bridge may be sent or pushed from the TMS 51 to the mobile terminal 10.

Also, as briefly mentioned above, the virtual trip lines may be defined for non-vehicular uses as well as vehicular uses. In this regard, the virtual trip lines may be defined based on location descriptors corresponding to any suitable public place(s)/area(s). For instance, a virtual trip line may be defined with location descriptors corresponding to an entrance of a restaurant or a museum, for example. As such, when a user such as a pedestrian having a mobile terminal 10 crosses the virtual trip line associated with the entrance of the restaurant or museum, data may be sent in the report to the TMS 51 indicating that the pedestrian has entered the restaurant or museum and based on the data in the report. The TMS 51 may determine the number or people entering the restaurant or museum versus the number of people leaving the restaurant or museum and this information may be sent to the mobile terminal 10 of the pedestrian as well as other mobile terminals from the TMS 51. It should be pointed out that the TMS 51 is capable of extrapolating from the data in the report(s), provided from the mobile terminals 10 of participants, the total number of people entering and exiting the restaurant or museum. The extrapolation may be done in any number of suitable ways. One example of how to extrapolate the data is to periodically have a device or person observe the actual number of people crossing one of the boundaries defined by a virtual trip line and by comparing the number of actual people crossing the boundary with the number of people that the traffic monitoring server 51 is aware of, the TMS 51 can compute a representative ratio of what fraction of people are participating in the traffic monitoring service.

Referring to FIG. 6, a flowchart relating to the operation of a traffic monitoring system according to an exemplary embodiment of the invention is provided. At operation, 600 virtual trip lines are defined having location descriptors, attributes or any other suitable data, as discussed above. At operation 605, the virtual trip lines are pre-stored on an electronic device such as mobile terminal 10 and at operation 610 the virtual trip lines may optionally be sent from (or downloaded from) a server such as traffic monitoring server 51 to the mobile terminal 10. At operation 615, when an electronic device such as mobile terminal 10 passes or crosses a virtual trip line, the mobile terminal is capable of determining which virtual trip line that it crossed, the direction in which the virtual trip line was crossed, the speed of the mobile terminal when the virtual trip line was crossed, the location/position of the mobile terminal when the virtual trip line was crossed, the time when the virtual trip line was crossed and any other suitable data. At operation 620, the electronic device such as mobile terminal 10 is able to send data, in a report, associated with the virtual trip line that was crossed and the direction in which the VTL was crossed, the speed of the mobile terminal when the virtual trip line was crossed, the location/position of the mobile terminal when the virtual trip line was crossed, the time when the virtual trip line was crossed and any other suitable data to a server such as traffic monitoring server 51. Alternatively, the mobile terminal may send the TMS 51 raw data and the TMS may use this raw data to calculate the virtual trip line that was crossed, the direction in which the VTL was crossed, the speed of the mobile terminal when the virtual trip line was crossed, the location/position of the mobile terminal when the virtual trip line was crossed, the time when the virtual trip line was crossed and any other suitable data. Optionally, at operation 625, the electronic device, i.e., mobile terminal 10 may only include data that is anonymous in the report and in this regard, the private information of the user as well as the mobile terminal are not included in the report that is sent to the traffic monitoring server 51 from the mobile terminal 10.

At operation 630, the server such as traffic monitoring server 51 evaluates the data in the report and may determine various attributes of "traffic data" such as the number of vehicles that are passing the respective virtual trip line per minute, the average speed of the vehicles passing the virtual trip line, as well as the traffic density of the area associated with the location descriptors of the virtual trip lines. At operation 635, the server, i.e., traffic monitoring server 51 may send the traffic data to each of the mobile terminals 10 in the traffic monitoring system 87. Optionally, at operation 640, the server, i.e., traffic monitoring server 51 may remove any identifiable information from the traffic data and send it to another server such as virtual trip line server 54 and the virtual trip line server 54 may send the traffic data received from traffic monitoring server 54 to one or more mobile terminals in the traffic monitoring system 87. In an exemplary embodiment, the traffic monitoring server 51 and the virtual trip line server 54 are capable of sending the traffic data to all mobile terminals in the traffic monitoring system 87 or a subset of all of the mobile terminals in the system 87, such as for example, mobile terminals in a particular city, or near a particular roadway, etc.

Referring now to FIG. 7, a diagram illustrating a scenario relating to traffic slowdown between virtual trip lines is provided. As can be seen in FIG. 7, the virtual trip line 90 has two endpoints 91 and 93 corresponding to location descriptors and is placed along a roadway 95. As shown in FIG. 7, a vehicle 97 which has a mobile terminal 10 (not shown) may cross or traverse the endpoints 91 and 93 of the virtual trip line 90. While one vehicle 97 is shown in FIG. 7 for sake of simplicity it should be understood that any number of vehicles may be traveling along roadway 95. Additionally, while FIG. 7 shows the vehicle 97 traveling in a North direction as indicated by the arrow and that the vehicle 97 traversed endpoint 93, the principles of the exemplary embodiments apply equally in the opposite direction such as a South direction in which the vehicle may first traverse endpoint 91 and these principles also apply equally in the East-West directions as well. Each of the endpoints 91 and 93 of the VTL 90 may serve as a measurement location based trigger. In this regard, when the mobile terminal 10 crosses or traverses an endpoint of the VTL, the controller 20 of the mobile terminal 10 may determine that it crossed the endpoint of the VTL, the direction in which the VTL was crossed and the location of the mobile terminal 10 and thus vehicle 97. The mobile terminal 10 may utilize GPS module 36 to determine its location relative to a street map that may be pre-loaded in one of its memories or retrieved from the memory 80 and sent to the mobile terminal 10 by the TMS 51.

The mobile terminal 10 may also determine the speed or velocity in which it is traveling as well as the speed or velocity of the vehicle 97 and any other suitable information. The mobile terminal 10 is capable of sending this information in an update or report to the TMS 51 in a manner analogous that discussed above. (See e.g., discussion of FIGS. 4A & 4B) For instance, when the mobile terminal 10 crosses or traverses one of these endpoints 91 and 93 of the VTL 90, the controller 20 of the mobile terminal 10 may generate an update or a report which may be sent to the TMS 51. In this exemplary embodiment for example, the vehicle 97 has just crossed or traversed endpoint 93 of the virtual trip line 90, which corresponds to a first measurement location i.e., measurement location 1, and as such the controller 20 of the mobile terminal is capable of generating a report that is sent to the TMS 51. This update or report is based at least in part on the location of the endpoint 91 of the virtual trip line 90.

Endpoint 91, of VTL 90, may serve as another measurement location based trigger, i.e., measurement location 2, along roadway 95. When the mobile terminal 10 traverses or crosses an endpoint such as endpoint 93 of VTL 90, the controller 20 of the mobile terminal may begin a predetermined time period. If the mobile terminal 10 does not reach or cross the endpoint 91 of VTL 90 within the time period, (e.g., 3 minutes) the controller 20 of the mobile terminal 10 may generate another update or report, which may be sent to the TMS 51. In addition to the information above, this update or report may also contain data such as for example a flag, which indicates that the time period expired and which serves to notify the TMS 51 that there may be a traffic slowdown (also referred to herein as traffic blockage 94) or stopped traffic along the roadway 95. For instance, in this example, the report or update may notify the TMS 51 that there is a traffic slowdown 94 or stopped traffic along the roadway 95 between the endpoints 93 and 91 of the VTL 90. This update or report is generated based in part on time and location, for instance the amount of time that has elapsed since traversing the endpoint 93 of the VTL 90. The time period may be selected at least in part based on the distance between the endpoints of a VTL and a calculated time delay in which the processor 74 of the TMS 51 is not allowed to send any updated traffic information to mobile terminals 10 subscribing to the traffic monitoring system 87. For instance, a decrease in time delay at a given distance between endpoints, may result in a decrease in the time period whereas an increase in the time delay for the same distance between the endpoints may result in an increase in the time period.

It should be pointed out that the reports or updates described herein may contain data such as a timestamp. The timestamp may consist of a string of one or more characters specifying the date and/or time at which a mobile terminal 10 crossed or traversed a virtual trip line or measurement locations of a virtual trip line such as the endpoints (e.g., endpoints 93 & 91) of a VTL. In this regard, the processor 74 of the TMS 51 is able to compare multiple timestamp records and determine the length of time that it took a mobile terminal 10 to travel between measurement locations such as endpoints of a virtual trip line (VTL 90). For example, when a mobile terminal 10 which may be in vehicle 97 crosses endpoint 93, i.e., measurement location 1, the controller 20 of the mobile terminal is able to generate a timestamp having data which indicates the date (e.g., Tuesday, Jan. 1, 2008) and time (e.g., 7:12 AM) that the mobile terminal traversed the endpoint 93 and this timestamp may be included in the report or update that the controller 20 of the mobile terminal 10 sends to the TMS 51. Also, for example, when the mobile terminal 10, which may be in vehicle 97, crosses endpoint 91, i.e., measurement location 2, the controller 20 of the mobile terminal is capable of generating a timestamp having data which indicates the date (e.g., Tuesday, Jan. 1, 2008) and time (e.g., 7:17 AM) that the mobile terminal 10 traversed the endpoint 93 and the controller 20 of the mobile terminal 10 may also send this timestamp to the TMS 51. The processor 74 of the TMS 51 is capable of analyzing the timestamps in reports or updates and determine the time that it took the mobile terminal 10 to travel between endpoints, which may serve as measurements locations, of a VTL. In the example above, by analyzing the timestamps the processor 74 of the TMS 51 is capable of determining that it took 5 minutes (e.g., 7:17 AM-7:12 AM) for the mobile terminal 10 to travel between endpoints 93 and 91.

In this regard, the TMS 51 is capable of analyzing a number of timestamps generated by one or more different mobile terminals (e.g., 5 different mobile terminals which may be in 5 different vehicles) traveling between measurement locations such as endpoints of a VTL and the processor 74 may determine an average time and speed that it takes a mobile terminal to travel between the measurement locations such as endpoints of a VTL at a given speed by analyzing these timestamps. For example, as noted above, the processor 74 of TMS 51 may determine that the time that it took for a mobile terminal 10 (first mobile terminal 10) to travel between endpoints 93 and 91 at a given speed (e.g., 60 mph) was 5 minutes. Additionally, by evaluating the timestamps of 4 other mobile terminals that traveled between endpoints 93 and 91 at a given speed, the processor 74 of the TMS may determine that a second mobile terminal 10 took 4 minutes to travel between endpoints 93 and 91 at the given speed (e.g., 65 mph), and that a third mobile terminal 10 took 6 minutes to travel between endpoints 93 and 91 at the given speed (e.g., 58 mph) whereas a fourth mobile terminal 10 took 4 minutes to travel between endpoints 93 and 91 at a given speed (e.g., 65 mph). Additionally, the processor 74 of the TMS 51 may determine that a fifth mobile terminal 10 took 3 minutes to travel between endpoints 93 and 91 at a given speed (e.g., 70 mph). As such, the processor 74 of the TMS 51 may calculate an average and determine that it takes a mobile terminal 10 approximately 4.4 minutes (e.g., (5 min.+4 min.+6 min.+4 min.+3 min.)/5=4.4 min.) to travel between measurement locations such as endpoints (e.g., endpoints 93 and 91) of a VTL at an average speed of 63.6 mph (e.g., (60 mph+65 mph+58 mph+65 mph+70 mph)/5=63.6 mph). While the TMS 51 is able to analyze the time that it took 5 different mobile terminals 10 to travel between measurement locations and calculate an average in the example above, it should be pointed out that the processor 74 of the TMS 51 is capable of evaluating the time it took any suitable number of mobile terminals 10 to travel between measurement locations and may calculate an average time that it takes to travel between measurement locations at a given speed by using the travel times between measurement locations associated with these mobile terminals.

Additionally, the processor 74 of the TMS 51 is capable of analyzing a time that it took for a mobile terminal 10 to travel between measurement locations and determine whether this time is invalid. For instance, if the processor 74 of the TMS 51 compares the average time (4.4 min.) that it takes a mobile terminal to travel between measurement locations at a given speed with a time that it took a given mobile terminal to travel between the measurement locations and the processor 74 determines that this time is outside of a threshold range (e.g., 75%) of the average time, (e.g., 4.4 min.) the processor 74 of the TMS 51 may determine that the travel time is invalid and the processor 74 may delete this time from a memory of the TMS 51. In the above example, the average time it took a mobile terminal to travel between endpoints 93 and 91 was 4.4 minutes. If for example, the processor 74 of the TMS 51 determines that it took a given mobile terminal 20 minutes to travel between endpoints 93 and 91, the processor 74 may consider this time data to be invalid since it is outside of the threshold range of the average time (e.g., 4.4 min.) and the processor 74 may delete this time from its memory such as memory 76. Conversely, in alternative exemplary embodiment, the controller 20 may not start a time period when the mobile terminal traverses a measurement location, and in this regard, a slowdown in traffic between measurement locations may be determined by the processor 74 of TMS 51 if a predetermined number (e.g., 3 or more) of mobile terminals have a travel time between measurement locations such as endpoints 93 and 91 for example that is higher than the average time by a specified amount (e.g., 30% greater than the average time) for a given time period. In this regard, the processor 74 of the TMS 51 is able to determine that traffic slowed down, or that there is a traffic jam or that traffic is blocked along the portion of the roadway that corresponds to the coordinates of the VTL and may send this information and any other suitable traffic information in one or more traffic updates (in the manner described more fully below) to mobile terminals 10 subscribing to the traffic monitoring system 87.

In situations in which a mobile terminal crosses or traverses a measurement location such as for example endpoint 93 and the controller 20 of the mobile terminal starts a time period which expires before the mobile terminal traverses another measurement location along a roadway and the controller 20 generates a report or update that is sent to the TMS 51 upon expiration of the time period, the processor 74 of the TMS 51 may utilize this received report or update to determine traffic conditions along the roadway associated with a VTL. In this regard, when the processor 74 of the TMS 51 receives this report or update, the processor 74 may detect the flag in the report and determine that the traffic between the measurement locations 93, 91 (e.g. ahead of the mobile terminal 10) has slowed down 94 or that the traffic between the measurement locations 93, 91 (e.g., ahead of the mobile terminal) has stopped. For instance, one way that the processor 74 of the TMS 51 can determine that the traffic ahead of the mobile terminal has stopped is if the report or update indicates that the speed of the mobile terminal is zero mph. On the other hand, the processor 74 may analyze the speed of the mobile terminal indicated in the report and if the speed is greater than zero mph, the processor 74 may determine that the traffic ahead of the mobile terminal has slowed down and/or that there is traffic blockage 94 or a traffic jam ahead of the mobile terminal 10.

In an alternative exemplary embodiment, the processor 74 of the TMS 51 may analyze the speed in the report that is generated upon the expiration of the time period by the controller 20 and if the speed is lower than the average speed traveled between the measurement locations by a predetermined amount (e.g., lowered by 25% or more), the processor 74 may determine that there is a slowdown in traffic, a traffic jam or traffic blockage 94 in front of the mobile terminal 10 along a roadway.

Since the mobile terminal 10, is capable of utilizing its GPS module 36 to determine its location and given that this information may be provided to the TMS 51 in the report or update that is generated by the controller 20 when the time period expires, the processor 74 of the TMS 51 is capable of determining the locations along a roadway such as roadway 95 in which the traffic has stopped and/or slowed down, and in which the traffic is dense or blocked. In this regard, the processor 74 may determine that there is a traffic jam along the relevant locations of the roadway. As discussed above, these locations may be associated with the coordinates of a VTL (e.g., VTL 90) that corresponds to the coordinates of the roadway (e.g., roadway 95).

As an example of the processor 74 of the TMS 51 sending traffic updates to the mobile terminals, the processor of the TMS 51 may determine that the traffic in one or more locations and areas along roadway 95 in front of vehicle 97 and up to measurement location 2, i.e., endpoint 91 has slowed down or stopped resulting in a traffic jam. In this regard, the processor 74 of the TMS 51, may send one or more traffic updates to one or more mobile terminals 10 subscribing to the traffic monitoring system 87. These traffic updates may include data indicating real-time traffic conditions along a roadway and/or the data may indicate that there is a traffic jam between the measurement locations or ahead of the vehicle 97 along the roadway and/or that a travel time to a particular destination may be increased and may indicate how long it would take to get from a starting point to a particular destination based on real-time traffic conditions.

The traffic update(s) may also consist of information identifying an alternate route to a destination or a route that avoids the traffic jam. In this regard, the update may contain information specifying the fastest alternative route and/or the shortest alternative route between a starting point and a destination and/or between a current location of a mobile terminal and a destination location as well as any other suitable information. For instance, the processor 74 of the TMS 51 may examine reports that it received from mobile terminals traveling along a roadway associated with a VTL and based on the data in the timestamps determine the anticipated traffic conditions during particular times of the day and/or week for the roadway. In this manner, the processor 74 of the TMS 51 may generate historical trends of traffic conditions along roadways that may be provided in the traffic updates that are sent to the mobile terminals 10 that subscribe to the traffic monitoring system 87. The processor 74 of the TMS 51 may also include one or more maps in the traffic updates that are sent to the mobile terminals 10. These maps may indicate the current location of a vehicle having a mobile terminal 10 (e.g., vehicle 47) relative to a roadway (e.g., roadway 95) and may indicate real-time traffic conditions. For instance, if there is a traffic jam along the roadway, the map may include data (e.g., superimposed images of vehicles) indicating that there are vehicles that are congested along the roadway. Additionally or alternatively, the maps may indicate point-to-point directions such as for example a current location to a destination location for an alternative route. For example, the roadway(s) associated with the alternate route(s) may be highlighted and/or colored (e.g., colored in red and/or yellow) to clearly indicate the route in which the mobile terminal should travel to reach the destination. Additionally or alternatively, the traffic updates may include turn-by-turn instructions relating to an alternative route or a new route. These turn-by-turn directions may be in text (e.g., "Turn right at Exit 3B") and/or may be audible and played by speaker 24 of the mobile terminal 10. The map(s) and the directions may be shown on display 28 of the mobile terminal 10.

Referring now to FIG. 8 a flowchart of a mechanism for determining traffic conditions between measurement locations associated with virtual trip lines is provided. At operation 800, a mobile terminal 10 may pass or traverse a measurement location, which may be defined by the coordinates of an endpoint of a VTL, that is associated with a section (e.g., a segment) of a roadway and a time period may be started. The time period may be started by a controller 20 or processor of the mobile terminal. At operation 805, an update or report may be generated by the mobile terminal and sent to a server such as for example TMS 51. As discussed above, the updates or reports described herein may include but is not limited to data (also referred to herein as measurement data) identifying that a mobile terminal passed or traversed an endpoint of a VTL, the location that the endpoint was traversed, the speed or velocity in which the mobile terminal 10 and/or the speed of a vehicle that may contain the mobile terminal as well as a timestamp that identifies the date and time in which the mobile terminal traversed the measurement location. At operation 810, when the time period expires prior to the mobile terminal passing or traversing another measurement location which may be defined by the coordinates of another endpoint of a VTL that is also associated with a section of the roadway, the mobile terminal may generate another update or report that may be sent to a server such as TMS 51. The distance between the endpoints, i.e., the measurement locations corresponds to the VTL which is defined according to coordinates of the roadway. This update or report may include but is not limited to measurement data and a flag indicating that the time period expired before the mobile terminal passed or traversed the next endpoint i.e., measurement location.

At operation 815, the server such as TMS 51 may utilize the data in the update or report generated when the time period expires to determine traffic conditions between the endpoints (e.g., measurement locations) of the VTL associated with the roadway. At operation 820, the server such as TMS 51 may generate traffic updates that may be sent to mobile terminals that subscribe to a traffic monitoring system such as traffic monitoring system 87. The data in the traffic updates may include but is not limited to an indication that there is a slowdown or that traffic has stopped between the measurement locations and/or that there is a traffic jam between the coordinates of the endpoints of the VTL associated with the roadway. The traffic updates sent to the mobile terminals by the server may also include a map indicating the area of the roadway that is experiencing the traffic jam as well as data associated with alternate or new travel routes which may be identified in one or more of the maps. The maps may be shown on a display of the mobile terminal.

According to the exemplary non-limiting embodiments described above, whenever one of the measurement locations is passed or traversed and a data measurement is made, a time period may be started. If a mobile terminal which may be in a vehicle is traveling towards another specified measurement location but does not reach the location before the time period expires, a new measurement update may be sent by the mobile terminal to the TMS 51. The information in this update may be utilized by a server such as TMS 51 to determine that there is a slowdown or blockage in traffic and/or that there is a traffic jam between the update locations. This allows the TMS

51 to respond to the slowdown/blockage in traffic or the traffic jam between the measurement locations along the roadway without having to wait until the mobile terminal reaches the next measurement location. This is beneficial because if the traffic stops or slows down, the mobile terminal may not reach the next measurement location along a roadway and the slowdown or stoppage in traffic may not be detected or at least not detected for a long time. An additional benefit of the exemplary embodiments is that updates are only generated when needed which conserves the resources of the traffic monitoring system and the updates generated by the traffic monitoring system 87 serves to preserve the privacy of subscribers of the mobile terminals because the updates are at least in part tied to or associated with locations. In an alternative exemplary embodiment, it should be pointed out that the TMS 51 may send its traffic updates to another server such as for example virtual trip line server 54 which may subscribe to the traffic monitoring system 87 and the virtual trip line server 54 may send the traffic updates to the mobile terminals 10 in the manner discussed above.

It should be understood that each block or step of the flowchart shown in FIGS. 6 & 8 and combination of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus (e.g., hardware) means for implementing the functions implemented specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the functions specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions that are carried out in the system.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
- receiving one or more geometrical boundaries defined with data, each geometrical boundary comprising a plurality of location descriptors, each of the location descriptors and the geometrical boundaries corresponds to a geographic area of the world;
- determining that at least one of the geometrical boundaries were traversed;
- starting a predetermined time period when the at least one geometrical boundary is traversed;
- generating a first set of data when the at least one geometrical boundary is traversed; and
- generating a second set of data when the predetermined time period expires.

2. The method of claim 1 further comprising, receiving one or more conditions based on the second set of data, when the predetermined time period expires, the one or more conditions are associated with the geographic area.

3. The method of claim 1, wherein prior to generating the second set of data, the method further comprises sending the generated first set of data to a device.

4. The method of claim 1, wherein each of the plurality of location descriptors comprises a set of location descriptors and the method further comprises, defining each set of location descriptors as a coordinate of latitude and longitude.

5. The method of claim 4, wherein the geometrical boundaries comprise lines and the plurality of location descriptors correspond to at least two different endpoints of a line.

6. The method of claim 5, wherein determining comprises determining that the coordinate of one of the endpoints was traversed.

7. The method of claim 6, wherein generating the first set of data is triggered upon traversal of the coordinate of the endpoint.

8. The method of claim 2, further comprising receiving the one or more conditions, which comprise data identifying real-time traffic conditions associated with the geographic area.

9. The method of claim 6, wherein the geographic area corresponds to a road and at least one of the lines corresponds to the coordinates of a segment of the road and the method further comprises receiving the one or more conditions which comprise data identifying real-time traffic conditions associated with the segment of the road.

10. The method of claim 9, further comprising determining that the data identifying real-time traffic conditions indicates at least one of a traffic jam, a slowdown in traffic, or that traffic is stopped between one or more coordinates of the endpoints of the line.

11. The method of claim 4, wherein the method further comprises determining that each set of location descriptors comprise an offset within a segment of a road.

12. The method of claim 1, further comprising storing the one or more geometrical boundaries in a memory.

13. An apparatus, comprising:
- at least one processor; and
- at least one memory including computer program code for one or more programs, the at least one memory and the computer program code configured to, with the at least one processor, cause the apparatus to perform at least the following, receive one or more geometrical boundaries defined with data, each geometrical boundary comprising a plurality of location descriptors, each of the location descriptors and the geometrical boundaries corresponds to a geographic area of the world;

determine that at least one of the geometrical boundaries were traversed;

start a predetermined time period when the at least one geometrical boundary is traversed;

generate a first set of data when the at least one geometrical boundary is traversed; and generate a second set of data when the predetermined time period expires.

14. The apparatus of claim 13, wherein the processor is further configured to receive one or more conditions based on the second set of data, when the predetermined time period expires, the one or more conditions are associated with the geographical area.

15. The apparatus of claim 13, wherein the processor is further configured to send the generated first set and the generated second set of data to a device.

16. The apparatus of claim 13, wherein each of the plurality of location descriptors comprises a set of location descriptors and the processor is further configured to define each set of location descriptors as a coordinate of latitude and longitude.

17. The apparatus of claim 16, wherein the geometrical boundaries comprise lines and the plurality of location descriptors correspond to at least two different endpoints of a line.

18. The apparatus of claim 17, wherein the processor determines that the geometrical boundaries were traversed by determining that the coordinate of one of the endpoints was traversed by the apparatus.

19. The apparatus of claim 18, wherein the processor is triggered to generate the first set of data upon traversal of the coordinate of the endpoint by the apparatus.

20. The apparatus of claim 14, wherein the processor is further configured to receive the one or more conditions, which comprise data identifying real-time traffic conditions associated with the geographic area.

21. The apparatus of claim 18, wherein the geographic area corresponds to a road and at least one of the lines corresponds to the coordinates of a segment of the road and the processor is further configured to receive the one or more conditions which comprise data identifying real-time traffic conditions associated with the segment of the road.

22. The apparatus of claim 21, wherein the processor is further configured to determine that the data identifying real-time traffic conditions indicates at least one of a traffic jam, a slowdown in traffic, or that traffic is stopped between one or more coordinates of the endpoints of the line.

23. The apparatus of claim 16, wherein the processor is further configured to determine that each set of location descriptors comprise an offset within a segment of a road.

24. The apparatus of claim 13, further comprising a memory which stores the one or more geometrical boundaries.

25. A computer program product, the computer program product comprising at least one computer-readable storage medium having computer-readable program code portions stored therein, the computer-readable program code portions comprising:

a first executable portion for receiving one or more geometrical boundaries defined with data, each geometrical boundary comprising a plurality of location descriptors, each of the location descriptors and the geometrical boundaries corresponds to a geographic area of the world;

a second executable portion for determining that at least one of the geometrical boundaries were traversed;

a third executable portion for starting a predetermined time period when the at least one geometrical boundary is traversed;

a fourth executable portion for generating a first set of data when the at least one geometrical boundary is traversed; and a fifth executable portion for generating a second set of data when the predetermined time period expires.

26. The computer program product of claim 25 further comprising a sixth executable portion for receiving one or more conditions based on the second set of data, when the predetermined time period expires, the one or more conditions are associated with the geographical area.

27. An apparatus comprising a processor configured to:

generate one or more geometrical boundaries defined with data, each geometrical boundary a plurality of location descriptors, each of the location descriptors and the geometrical boundaries corresponds to a geographic area of the world; and send the one or more geometrical boundaries to a terminal which uses the data to trigger generation of information that is associated with the terminal and the geographic area.

28. The apparatus of claim 27, wherein the processor is configured to define the data with a predetermined time period, wherein traversal of at least one of the geometrical boundaries triggers generation of additional information associated with the terminal and the geographic area upon expiration of the predetermined time period.

29. The apparatus of claim 27, wherein the geometrical boundaries comprise lines and the plurality of location descriptors correspond to at least two different endpoints of a line, and wherein the processor is configured to select the predetermined time period at least in part on the basis of a distance between the endpoints of the line and a time delay for reporting one or more conditions.

30. The apparatus of claim 29, wherein the one or more conditions comprise real-time traffic conditions.

31. The apparatus of claim 30, wherein the real-time traffic conditions comprise at least one of a traffic jam, a slowdown in traffic, or that traffic is stopped between one or more coordinates of the endpoints of the line.

32. The apparatus of claim 29, wherein the one or more conditions comprise data corresponding to a map indicating at least one of a slowdown in traffic, or that traffic is stopped, or a traffic jam between one or more coordinates of the endpoints of the line.

33. The apparatus of claim 29, wherein the one or more conditions comprise data specifying an alternate route in which to travel from a current location to a destination location.

34. The apparatus of claim 27, further comprising a memory which stores the one or more geometrical boundaries.

35. A method comprising:

generating one or more geometrical boundaries defined with data, each geometrical boundary comprises a plurality of location descriptors, each of the location descriptors and the geometrical boundaries corresponds to a geographic area of the world; and sending the one or more geometrical boundaries to a terminal which uses the data to trigger generation of information that is associated with the terminal and the geographic area.

36. The method of claim 35, further comprising defining the data with a predetermined time period, wherein traversal of at least one of the geometrical boundaries triggers generation of additional information associated with the terminal and the geographic area upon expiration of the predetermined time period.

37. The method of claim 35, wherein the geometrical boundaries comprise lines and the plurality of location descriptors correspond to at least two different endpoints of a line, and wherein the method further comprises selecting the predetermined time period at least in part on the basis of a distance between the endpoints of the line and a time delay for reporting one or more conditions.

38. The method of claim 37, wherein the one or more conditions comprise real-time traffic conditions and the real-time traffic conditions comprise at least one of a traffic jam, a slowdown in traffic, or that traffic is stopped between one or more coordinates of the endpoints of the line.

* * * * *